April 24, 1928.
W. S. PRITCHARD
1,666,912
WINDSHIELD OPERATING MECHANISM
Filed June 14, 1926
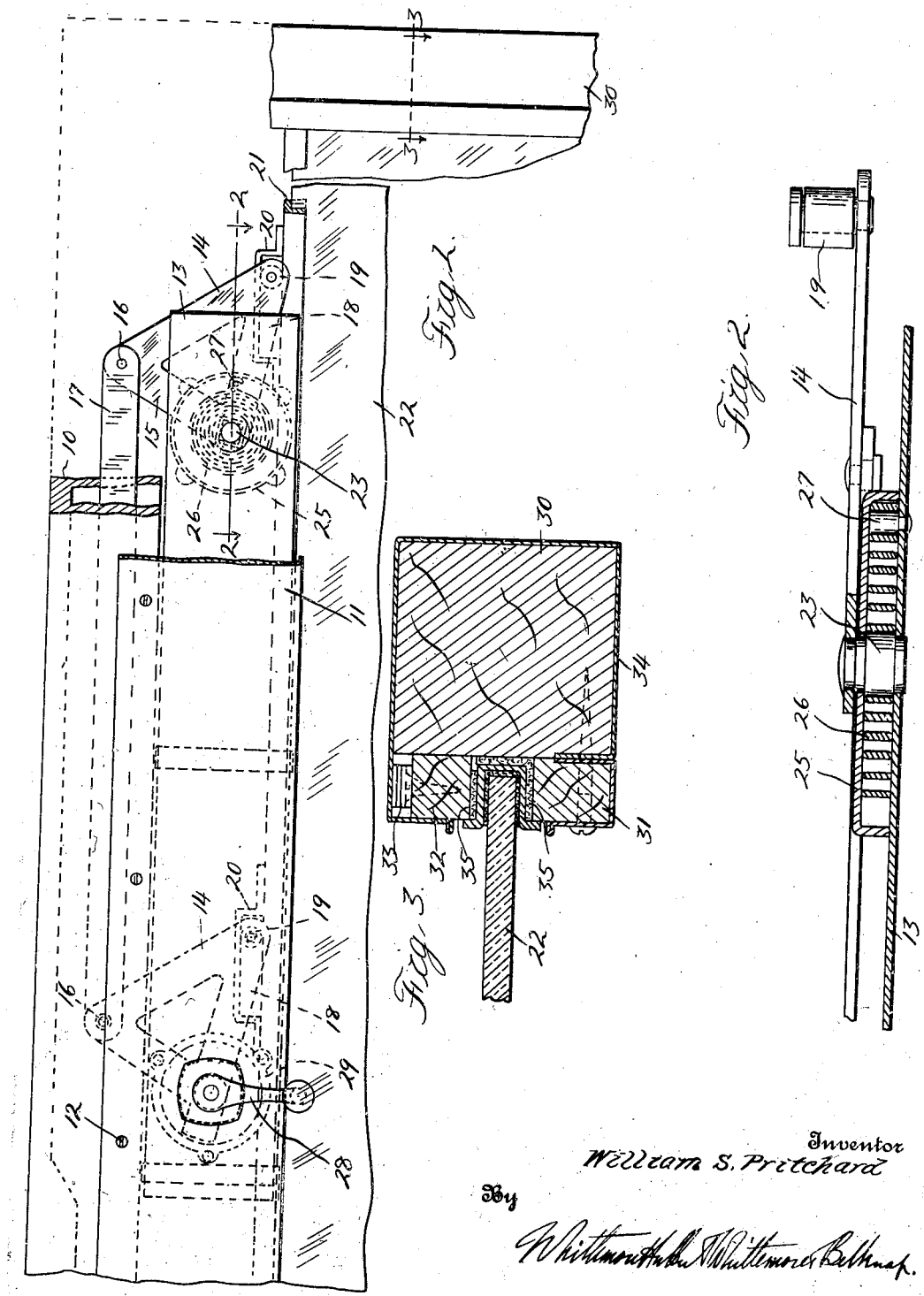
Inventor
William S. Pritchard
By
Attorneys Patented Apr. 24, 1928.

1,666,912

UNITED STATES PATENT OFFICE.

WILLIAM S. PRITCHARD, OF DETROIT, MICHIGAN, ASSIGNOR TO MOTOR PRODUCTS CORP., OF DETROIT, MICHIGAN, A CORPORATION OF NEW YORK.

WINDSHIELD-OPERATING MECHANISM.

Application filed June 14, 1926. Serial No. 115,989.

This invention relates to windshield operating mechanism and more particularly to mechanism of this character adapted to operate slidable windshields, windows and the like.

The invention relates particularly to windshield operating mechanism including a plurality, preferably two levers such as bell cranks spaced apart but interconnected for synchronous operation whereby the operating power may be applied at one point but transmitted to the windshield at a plurality of spaced points to thus insure an even operation of the latter.

The invention contemplates other objects, advantages and novel details of construction all of which will be made more apparent as this description proceeds, especially when considered in connection with the accompanying drawing wherein;

Figure 1 is a fragmentary elevational view of a windshield and operating mechanism constructed in accordance with this invention.

Figure 2 is an enlarged fragmentary sectional view taken substantially on the plane indicated by line 2—2 in Figure 1 and Figure 3 is a sectional view taken substantially on the plane indicated by line 3—3 in Figure 1.

Referring now particularly to the drawing wherein like reference characters indicate like parts it will be noted that there is illustrated the header 10 of a motor vehicle which is of a hollow construction to accommodate the upper edge of the windshield and of the operating mechanism yet to be described and which includes as a part thereof a depending plate 11 peripherally secured to the header part 10 as for instance by means of screws 12.

Mounted within the header is a plate-like bracket or supporting element 13 which affords a pivotal support for a pair of levers 14 herein shown as triangular-shaped bell crank levers including a pair of arms 15 pivotally connected as at 16 by means of a link 17 and a pair of arms 18 carrying stud-like rollers 19 adapted to engage in guides 20 secured to the top frame 21 of the windshield 22. These bell cranks are pivotally mounted as at their apexes to the supporting member 13. It will be noted that the link 17 which interconnects the pair of spaced bell cranks provides for a synchronous operation thereof.

The pivotal stud 23 of the lever 14 located to the right extends through a housing 25 secured to the supporting member 13 and enclosed within this housing is a counter-balancing spring 26 anchored at one end as at 27 and connected at its other inner end to the stud 23. The function of this spring is to counter-balance the weight of the windshield 22.

The other bell crank lever 14 is rotated by a handle 28 through the intermediary of a planetary gearing contained within the housing 29. While this gearing may be of any desired construction it is preferably of the character described and claimed in the application of Carl B. Parsons, Serial #76,813, filed December 21, 1925. The handle 28 is mounted on the outer end of the stud 24 the other end of which extends into the housing 29 and carries the pinions of the planetary gearing. Thus the handle will be arranged in a position accessible to the driver of the vehicle.

With the construction as thus far described it will be apparent that the pair of levers 14 may be operated in unison to oscillate the same about their pivots whereby through their connection with the windshield they will impart thereto a vertical sliding movement. Obviously by spacing the levers 14 longitudinally of the upper edge of the windshield the working effort of these levers may be more effctivly transmitted to the windshield to cause the same to slide up and down evenly and without binding.

In Figure 3 the construction of the guides for the sides of the windshield is illustrated. It will be noted that each pillar 30 is formed with a vertically extending shoulder 31 with which a movable strip 32 cooperates to form a guide slot or groove to receive the adjacent edge of the windshield. The strip 32 is urged toward the windshield by means of springs 33 interposed between this strip and the covering 34 of the pillar. Felt anti-rattling strips 35 will preferably be interposed between the edge of the windshield and the walls of the guide slot. Such a construction provides an efficient anti-rattling connection between the windshield and side pillars.

From the foregoing it will be readily apparent that the herein described construction affords simple but satisfactory means for operating a vertically movable windshield, window or the like. The construction and arrangement of the several parts of the apparatus offers the possibility of constructing the same as a unit prior to its assembly with the windshield header. It will furthermore be obvious to those skilled in this art that the invention is not limited to use in connection with the frictional guiding means for the side of the windshield as such means may be eliminated entirely or other suitable guiding means substituted therefor. Reservation is therefore made to make such changes in the details of construction as found necessary or expedient and as may come within the purview of the accompanying claims.

What I claim as my invention is:

1. The combination of a slidable windshield, of an operating mechanism therefor including, a pair of spaced levers connected for parallel movement, means connecting said levers to the windshield, a counter-balancing spring associated with one lever and an operating handle connected to one of said levers.

2. In a windshield operating mechanism, a pair of spaced bell cranks, means for pivotally mounting said bell cranks at their apexes, means connecting corresponding arms of said bell cranks, means for connecting the other arm of said bell cranks to said windshield and means for oscillating one of said bell cranks.

3. In a windshield operating mechanism, a supporting element, a pair of bell cranks pivotally mounting at spaced points on said supporting element, means for interconnecting said bell cranks, means for connecting said bell cranks to the windshield to be operated at spaced points on the latter and means for oscillating one of said bell cranks.

4. In a windshield operating mechanism, a supporting element, a pair of bell cranks pivotally mounting at spaced points on said supporting element, means for interconnecting said bell cranks, means for connecting said bell cranks to the windshield to be operated at spaced points on the latter, a counterbalancing spring associated with said bell cranks and means for operating one of said bell cranks.

In testimony whereof I affix my signature.

WILLIAM S. PRITCHARD.